US009210134B2

(12) United States Patent
Dottax et al.

(10) Patent No.: US 9,210,134 B2
(45) Date of Patent: Dec. 8, 2015

(54) CRYPTOGRAPHIC PROCESSING METHOD AND SYSTEM USING A SENSITIVE DATA ITEM (71) Applicant: Oberthur Technologies, Colombes (FR)

(72) Inventors: Emmanuelle Dottax, Colombes (FR); Michele Sartori, Colombes (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 0 days.

(21) Appl. No.: 14/190,236

(22) Filed: Feb. 26, 2014

(65) Prior Publication Data
US 2014/0245005 A1 Aug. 28, 2014

(30) Foreign Application Priority Data

Feb. 27, 2013 (FR) .................................. 13 51730

(51) Int. Cl.
*H04L 29/06* (2006.01)
*G06F 21/46* (2013.01)

(52) U.S. Cl.
CPC ............ *H04L 63/0428* (2013.01); *G06F 21/46* (2013.01); *G06F 2221/2133* (2013.01)

(58) Field of Classification Search
CPC .................................................. H04L 63/0428
USPC ........................................................ 713/168
See application file for complete search history.

(56) References Cited

U.S. PATENT DOCUMENTS

| 8,112,483 | B1 * | 2/2012 | Emigh et al. ................ 709/206 |
| 8,572,737 | B2 * | 10/2013 | Holloway et al. ............. 726/23 |
| 2009/0138723 | A1 * | 5/2009 | Nyang et al. ................. 713/182 |
| 2010/0037147 | A1 * | 2/2010 | Champion et al. ............ 715/751 |
| 2011/0296509 | A1 * | 12/2011 | Todorov .......................... 726/7 |
| 2013/0262864 | A1 * | 10/2013 | Hamid ........................... 713/165 |

OTHER PUBLICATIONS

French Search Report dated Nov. 19, 2013, corresponding to the Foreign Priority Application No. 1351730.
Imran Erguler, et al.; "A Password-Based Key Establishment Protocol with Symmetric Key Cryptography"; Networking and Communications; Oct. 12, 2008; pp. 543-548; XP031350776.
Ya-Jun Fan, et al.; "Smart Card-Based Authenticated Key Exchange Protocol With Captcha for Wireless Mobile Network"; Future Computet and Communication (ICFCC); May 21, 2010; pp. V2-V119; XP031698749.

(Continued)

*Primary Examiner* — Michael S McNally
(74) *Attorney, Agent, or Firm* — Young & Thompson (57) ABSTRACT

A cryptographic processing method using a sensitive data item in a cryptographic processing system including in memory a test making it possible to tell a human and a computer apart and a reference value obtained by applying a cryptographic function to a pair of values P and R, where P is the sensitive data item and R is a solution to the memorized test, the method including the steps of: configuring the cryptographic processing system, including obtaining and memorizing the reference value in the cryptographic system; transmitting the memorized test to a user; obtaining the user's response to the transmitted test; a cryptographic processing step based on the sensitive data item, using the obtained response, the reference value and the cryptographic function. The reference value and memorized test are in the memory of the system and the solution is not in the memory of the system, during the transmission step.

18 Claims, 5 Drawing Sheets

(56) References Cited

OTHER PUBLICATIONS

Jung-San Lee, et al.; "An Interactive Mobile SMS Confirmation Method Using Secret Sharing Technique"; Computers & Security; vol. 30, No. 8; Jul. 6, 2011; pp. 830-839; XP028106927.

T.H. Chen, et al.; "A Novel User-Participating Authentication Scheme"; Journal of Systems & Software; vol. 83, No. 5; May 1, 2010; pp. 861-867; XP026932537.

Daher Waseem, et al.; "POSH"; Proceedings of the 1st ACM Workshop on Workshop on AISEC; Jan. 1, 2008; p. 1; XP055088840.

\* cited by examiner

CRYPTOGRAPHIC PROCESSING METHOD AND SYSTEM USING A SENSITIVE DATA ITEM

This patent application claims the priority of the French patent application N° 1351730 of 27 Feb. 2013, which is incorporated by reference into the present application.

FIELD OF THE INVENTION

The invention relates to the security of sensitive data items, particularly when they are stored in a non-secure environment.

In particular, the invention relates to a cryptographic process using a sensitive data item in a cryptographic processing system and proposes to secure access to this sensitive data item during implementation of this process.

BACKGROUND OF THE INVENTION

Today, many services are available on cryptographic processing systems, such as terminals for example. Access to some of these services can sometimes be protected by a sensitive data item such as a password or a cryptographic key, notably when these services involve sensitive information, such as banking details for example.

The storage of such sensitive data is generally required with a view to a subsequent authentication or decryption of encrypted information. Ideally, these sensitive data items would have to be stored in a secure memory of the terminal in order to avoid them being hijacked, by a malicious application for example.

However, many terminals do not have enough space inside a secure memory to store such sensitive data items, or quite simply do not contain such a memory. It can therefore be easy for an attacker to recover these sensitive data items from a non-secure memory and use them to obtain the sensitive information used by the corresponding services.

To complicate attacks by automatic systems, it is desirable to avoid handling the password P directly outside of any possible prior configuration step, for example by using a hash value C of this password, obtained for example during this configuration step using a cryptographic function F. For example, $C=F(P, R)$ where R is any value, random for example.

Such a technique is known from document US 2011/0296509, which proposes a solution based on a challenge-response of CAPTCHA ("Completely Automated Public Turing test to tell Computers and Humans Apart") type making it possible to automatically tell a human user and a computer apart. The proposed solution relies on the storage in a database of the value R and of a CAPTCHA-challenge ChallR to which R is the response. In particular, it involves using a response R' from the user to the CAPTCHA-challenge ChallR that is submitted to him, for computing $C'=F(R', P')$, the password P' also being entered by the user. C' is then compared to $C=F(P, R)$ computed by a server based on the memorized value R and on the password P, in order to verify the match between P' and P.

A current technique for preventing an attacker from easily finding the password P consists in storing it, not directly as in the system of US 2011/0296509, but indirectly via the value $C=F(P, R)$, accompanied by the corresponding value R.

Nonetheless, brute force attacks are known consisting in recovering $C=F(P, R)$ and R memorized in a system, then in automatically testing all the different possible passwords P.

Generally, passwords P are of limited complexity. For example a PIN code encoded on 4 bits only represents $10^4$ possibilities to test.

An attacker can therefore quickly work backwards to P and to any sensitive information it protects.

SUMMARY OF THE INVENTION

The object of the present invention is thus to alleviate at least one of these drawbacks.

In this context, a first aspect of the invention relates to a method of cryptographic processing using a sensitive data item in a cryptographic processing system comprising in memory a test making it possible to tell a human and a computer apart, as well as a reference value obtained by applying a cryptographic function to a pair of values P and R, where P is the sensitive data item and R is a solution to the memorized test, the method comprising:

a step of configuration of the cryptographic processing system, comprising the obtaining and memorization of the reference value (Co) in the cryptographic system, then a step of transmission of the memorized test to a user, a step of obtaining a response from the user to the transmitted test, a step of cryptographic processing based on the sensitive data item, using the obtained response, the reference value and the cryptographic function, the method being characterized in that the reference value and the test are in the memory of the cryptographic processing system and the solution is not in the memory of the system, during the transmission step.

Correlatively, a second aspect of the invention relates to a cryptographic processing system comprising:

at least one memory comprising a test making it possible to tell a human and a computer apart, as well as the reference value obtained by applying a cryptographic function to a pair of values P and R, where P is a sensitive data item and R is a solution to the test, means of configuration of the cryptographic processing system, comprising means of obtaining and memorization of the reference value in the cryptographic system, prior to the transmission of the memorized test to a user, means of transmission of the test to a user, means of obtaining a response from the user to the transmitted test, processing means configured to perform cryptographic processing based on the sensitive data item using the obtained response, the reference value and the cryptographic function.

The system is characterized in that it comprises the reference value and the test in memory, and does not comprise the solution in memory, when the transmission means are implemented.

In a variant, the system is characterized in that it comprises the reference value and the test in non-volatile memory, and does not comprise the solution in non-volatile memory.

Such a system can be a terminal, for example of mobile telephony terminal type, a laptop computer or a tablet computer. It can also involve a server and a terminal in a client-server architecture. The system exhibits similar advantages to the method according to the invention.

The invention makes it possible to improve the security of the sensitive data item by avoiding brute force attacks via which an automatic attacking system having knowledge of the cryptographic function seizes the reference value and the any value used in the test, both memorized in a system to deduce the sensitive data therefrom in an automated manner.

This security improvement is obtained by avoiding the storage of the any value (here the solution) in the memory at the moment when the corresponding test is transmitted to the user, but by storing this test and the reference value—or hash value—based on the sensitive data item, or by storing them in a non-volatile memory. The invention memorizes the sensitive data item and the any value in a form that makes it possible to avoid automatic attacks.

Specifically, the test makes it possible to obtain the any value from the user. This any value and the reference value indirectly storing the sensitive data item are then sufficient, with the help of the cryptographic function, to carry out cryptographic computations based on the sensitive data item. And if an attacker did recover the contents of the memory, it would need the involvement of a human to solve the test and obtain the solution in order to work backwards to the sensitive data item.

The aforementioned test can be a CAPTCHA-challenge, the solution to which is a CAPTCHA-response.

In a variant, the test could be any other means making it possible to automatically tell a human and a computer apart.

Other features of the method and the system according to embodiments of the invention are described in the dependent claims.

In a first embodiment of the invention, the method furthermore comprises a step of obtaining a data item entered by the user, and the cryptographic processing step comprises:
  a step of computation of a value obtained by applying the cryptographic function to a pair of values P' and R', where P' is the entered data item and R' is the obtained response, and
  a step of comparison of the computed value with the reference value, so as to verify that the entered data item is equal to the sensitive data item.

Correlatively, the system according to the invention can comprise means relating to these steps.

This embodiment can advantageously take part in a process of authentication of a user by password.

This configuration makes it possible to verify the validity of the data item entered by the user without for all that storing the sensitive data item to which it must correspond, thereby improving the security of the authentication operations.

In a particular case of this first embodiment, the entered data item can incorporate the response of the user to the test. In this case, the authentication is performed more quickly since it makes it possible to save on exchanges with the user because a single obtaining step makes it possible to recover at one and the same time the response to the test and the data to be verified.

According to a particular feature, the cryptographic function is a one-way function.

Thus, it is difficult for an attacker to retrieve the sensitive data from this cryptographic function, which is difficult to invert. It is also complicated to find two separate data items such that the values obtained by applying the cryptographic function to these two data are equal.

This function can for example be a simple hash function or a hash function composed of another hash function, or a SHA3 function, or else a block encryption function of AES or DES type.

In a second embodiment of the invention, the cryptographic processing step comprises:
  a step of computation of a value obtained by applying a reciprocal function of the cryptographic function to a pair of values Co and R', where Co is the reference value and R' is the obtained entered response, and
  a step of encryption or decryption of a sensitive information item using the computed value of the reciprocal function.

Correlatively, the system according to the invention can comprise means relating to these steps.

This second embodiment makes it possible to secure sensitive information items, for example during their storage for access purposes or for their transmission after encryption.

According to a particular feature, the computed value of the reciprocal function is an encryption key used in the decryption step to decrypt the encrypted sensitive information item stored in the memory of the cryptographic processing system.

This means that the encrypted sensitive information item has been obtained by encryption of a sensitive information item by an encryption key equal to the sensitive data item.

This embodiment makes it possible to secure access to sensitive information items, notably when the sensitive data item serves as key for the encryption of these information items.

In a variant, the encrypted sensitive information item to be decrypted is the computed value of the reciprocal function, and the step of decryption of the computed value of the reciprocal function comprises the use of an encryption key based on the response obtained from the user.

This means that the sensitive data item, i.e. the encrypted sensitive information item, has been obtained by encryption of a sensitive information item by an encryption key based on the solution.

This embodiment makes it possible to secure access to sensitive information items, notably when the sensitive data item itself constitutes the encrypted version of these information items.

In a particular embodiment, the cryptographic function and its reciprocal are asymmetrical encryption functions of which the pair of asymmetrical encryption keys is based on the solution to the memorized test.

According to a particular feature, the cryptographic processing system furthermore comprises in memory a message authentication code applied to the sensitive information item and having for secret key the sensitive data item or the solution, and in that the cryptographic processing step furthermore comprises:
  a step of computation of a message authentication code applied to the decrypted sensitive information item and having for secret key the encryption key computed or obtained by the cryptographic processing system, and
  a step of verification of the integrity of the decrypted sensitive information item by comparison of the memorized authentication code with the computed authentication code.

The use of message authentication codes makes it possible to ensure an additional level of security by verifying that the decrypted sensitive information is definitely that which is expected. If a false encryption key was to lead to the compromising of the decrypted information, an attacker attempting to decrypt the sensitive information with a false encryption key would obtain erroneous and therefore useless information.

In a particular embodiment of the invention, the cryptographic function is also a function of a secret parameter memorized in the code of a computer program.

This secret parameter makes it possible to add a degree of security during the computations of the cryptographic function, notably when no secure memory is available.

This secret parameter can be updated regularly, for example on starting up the system.

It can for example be hidden in the code of a computer program also comprising the code of the cryptographic function, the code of the latter and the secret parameter being memorized in a distinct and independent manner in the computer program code. Of course, as a variant, the secret parameter can be in another memory (non-secure for example) than the cryptographic function.

In a particular embodiment of the invention, the method furthermore comprises a new iteration of the steps of transmission, obtaining of a second response entered by the user and cryptographic processing, using a second test making it possible to tell a human and a computer apart, having a second solution, and of a second reference value obtained by applying the cryptographic function to a pair of values P and $R_2$, where P is the sensitive data item and $R_2$ is the second solution, the second reference value and the second test being in the memory of the cryptographic processing system and the second solution not being in the memory of the system during the step of transmission of this new iteration.

Transmitting a new test makes it possible to prevent the phenomenon of learning by the attacker and therefore further improves the security of the sensitive data item.

In a particular embodiment, the test and the reference value of the previous iteration are removed from the system memory, allowing memory space to be freed up.

In a variant, the second reference value can be computed incrementally, i.e. from the reference value of the previous test and from the second solution, notably without directly handling the sensitive data item.

Thus, the computation of the new reference value does not require access to the sensitive data item, reinforcing the security of the latter.

In a particular embodiment, the various steps of the cryptographic processing method are determined by computer program instructions.

Consequently, the invention also concerns a computer program on an information medium, this program being able to be implemented by a computer, this program comprising instructions suitable for the implementation of the steps of the method as mentioned above.

This program can use any programming language, and be in the form of source code, object code, or any intermediate code between source code and object code, such as in a partially compiled form, or in any other desirable form.

The invention also concerns a computer-readable information medium comprising instructions of a computer program as mentioned above.

The information medium can be any entity or device capable of storing the program. For example, the medium can comprise a storage means, such as a ROM, for example a CD ROM or a microelectronic circuit ROM, or else a magnetic recording means, for example a floppy disk, a hard disk, or else a flash memory.

Additionally, the information medium can be a transmissible medium such as an electrical or optical signal, which can be forwarded by an electrical or optical cable, by radio or by other means. The program according to the invention can in particular be downloaded onto a storage platform of a network of Internet type.

Alternatively, the information medium can be an integrated circuit in which the program is incorporated, the circuit being suitable for executing or being used in the execution of the method in question.

The information medium and the computer program mentioned above exhibit analogous features and advantages to the methods that they implement.

BRIEF DESCRIPTION OF THE FIGURES

Yet more particularities and advantages of the invention will become apparent in the description below, illustrated by the attached figures which illustrate embodiments thereof devoid of any limiting nature. In these figures.

DETAILED DESCRIPTION OF THE INVENTION

Figure 1:
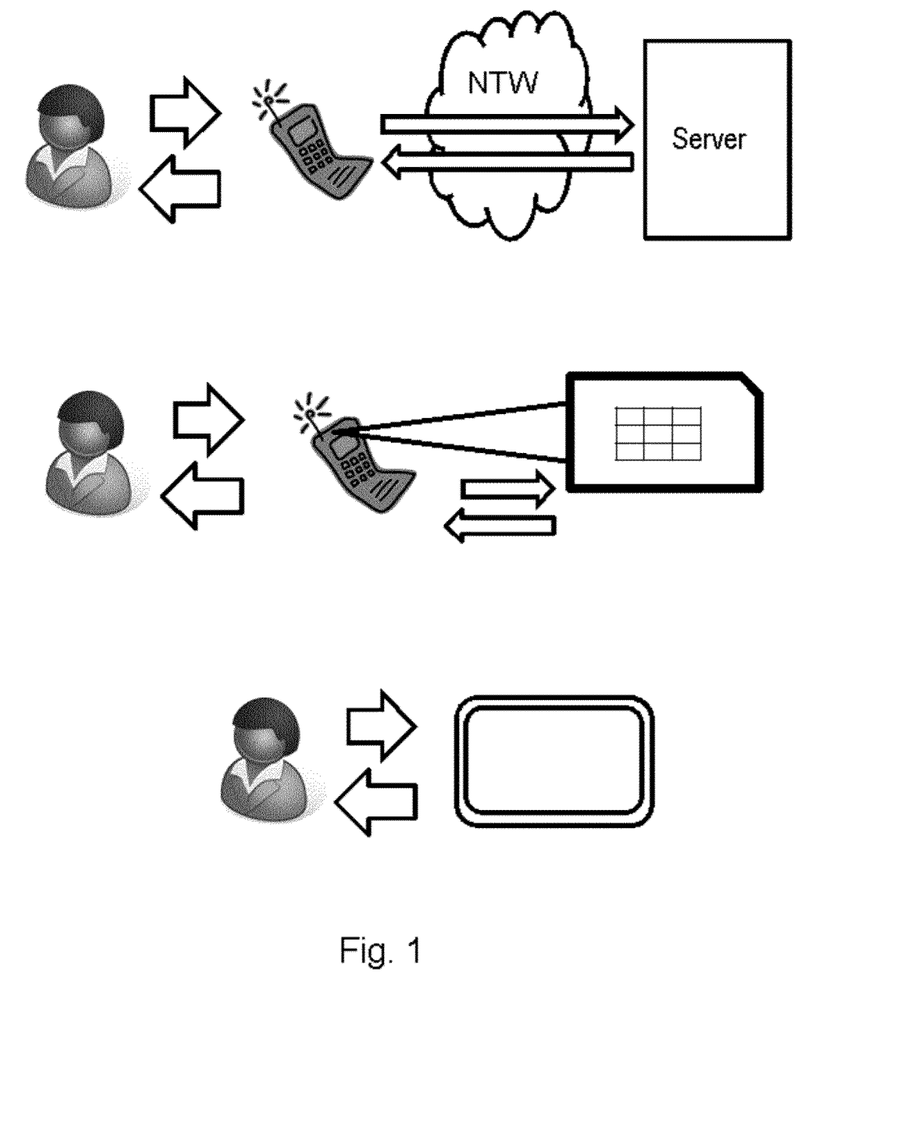
FIG. 1 illustrates several examples of systems according to the invention.

FIG. 1 illustrates several examples of cryptographic processing systems according to the invention, suitable for implementing the main steps of a cryptographic processing method as described below with reference to FIG. 3, 4, 6, or 7.

Such a system can comprise one or more intercommunicating devices, at least one of which is configured to enable a user to interact with the system.

The first example represented is a system of client-server type comprising two devices, namely a server and a mobile telephony terminal on which a client is installed. The client installed on this terminal communicates by way of a telephone network NTW with the server.

Generally, the invention can be used to secure data stored on a server.

Returning to this example, the mobile telephony terminal is configured so that a user can interact with the system. Specifically, it is endowed with a screen and a keyboard that can be merged (touch-sensitive screen).

The methods according to the invention can be implemented entirely on the terminal or on the server, or be distributed over both devices.

The second example of a system represented comprises a mobile terminal itself comprising a secure element, removable like a SIM card or embedded like an eSE.

For reasons of simplicity of terminology, the secure element will subsequently be considered to be a device comprising an autonomous processing unit as will be described below with reference to FIG. 2.

In this example, the mobile terminal is configured so that a user can interact with it, for example via a keyboard and a screen, possibly merged.

The third example represented is a tablet computer. In this third example, a user can interact with the tablet by way of its touch-sensitive screen and, for example, a virtual keyboard.

These examples of cryptographic processing systems are not limiting. Indeed, the methods according to the invention can be implemented in any type of device possessing an architecture such as that described below, for example with reference to FIG. 2.

Figure 2:
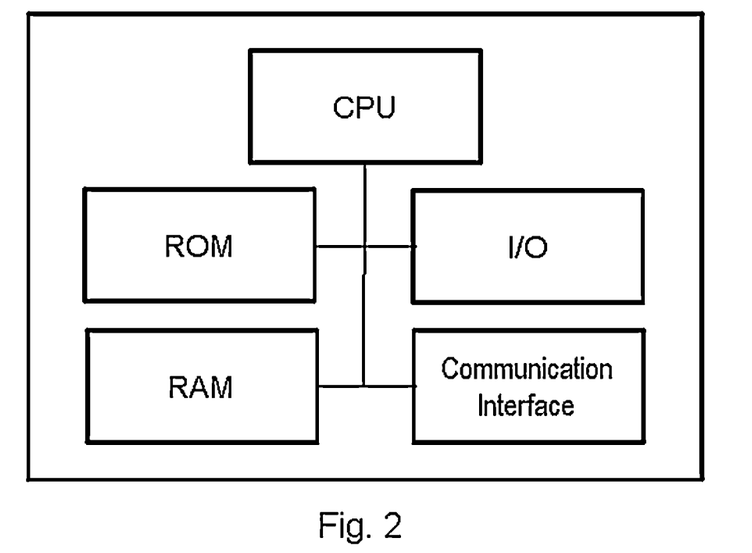
FIG. 2 illustrates an example of hardware architecture for the device or devices for the cryptographic processing system in FIG. 1.

FIG. 2 illustrates an example of hardware architecture for the device or devices forming a cryptographic processing system, for example as described with reference to FIG. 1.

In this example, the device comprises a communications bus to which are linked:

- a processing unit or microprocessor denoted CPU (Central Processing Unit);
- one or more non-volatile memories, ROM (Read Only Memory) for example, being able to constitute a medium in the sense of the invention, i.e. being able to comprise a computer program comprising instructions for the implementation of a cryptographic processing method according to the invention; this non-volatile memory can also be an EEPROM (Electrically Erasable Programmable Read Only Memory) or else a flash memory;
- a live memory or cache memory or volatile memory, RAM (Random Access Memory) for example, comprising registers suitable for the recording of variables and parameters created and modified during the execution of the aforementioned program; during the implementation of the invention, the instruction codes of the program stored in non-volatile memory (e.g. EEPROM or flash) are loaded into RAM with a view to being executed by the processing unit CPU;
- a communications interface suitable for transmitting and receiving data, for example via a telecommunications network or a read/write interface of a secure element;
- an input/output interface I/O, for example a screen, a keyboard, a mouse or any other pointing device such as a touch-sensitive screen or a remote control; this interface I/O allows the user to interact with the system throughout the implementation of the method via a graphic interface.

The communications bus allows the communication and the interoperability between the various elements included in the device or linked to it. The representation of the bus is not limiting, and, notably, the processing unit is able to communicate instructions to any element of the device directly or by way of another element of this device.

Figure 3:
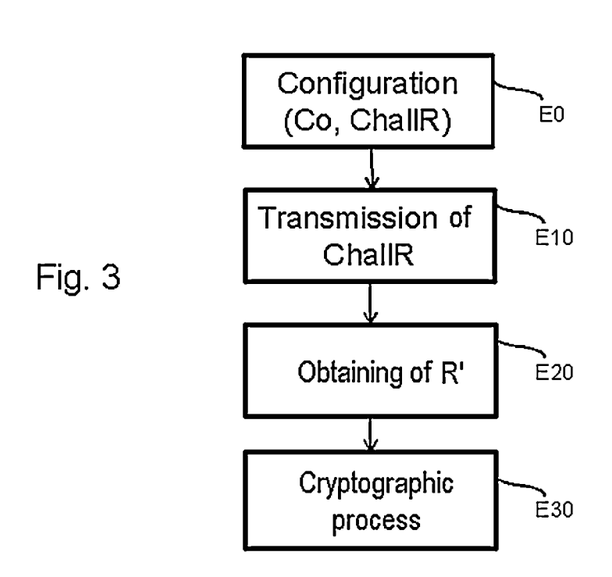
FIG. 3 represents a flowchart illustrating the general steps of a cryptographic processing method according to the invention.

FIG. 3 represents a flowchart illustrating the general steps of a cryptographic processing method according to the invention, being able to be implemented in each of the systems described previously with reference to FIG. 1.

According to cryptographic processing systems, the various steps of the aforementioned method are either implemented by a single device, or are distributed between the different devices of the system.

Generally, this cryptographic processing method calls on variables/parameters stored in one or more memories, ROM for example, of the system implementing it.

In particular, the implementation of the method requires the prior memorizing:

- of a test making it possible to tell a human and a computer apart, for example an automatic test of CAPTCHA-challenge type ChallR used to obtain from a user a response R' necessary to the cryptographic process, as well as
- of a so-called reference value Co hiding a sensitive data item P (for example a password) using the solution to the test here called CAPTCHA-response to the memorized CAPTCHA-challenge, Co being used subsequently to authenticate a data item P' obtained from a user or to take part in the decryption of sensitive information items or else in the encryption of data items Data.

In the rest of the description, to simplify, the test ChallR will still be a CAPTCHA-challenge, the solution to which is called CAPTCHA-response R. Nonetheless, any other means making it possible to automatically tell a human from a computer can be used in a variant.

The reference value Co is the result obtained by applying a cryptographic function F to a pair of values P and R: Co=F(P, R), where P, the sensitive data item, can be a password or an encryption key or else an encrypted sensitive information item, and R is the CAPTCHA-response to the aforementioned CAPTCHA-challenge.

In practice, the presence of these variables/parameters inside the non-volatile memory is the result of a prior configuration step E0 of the system. This configuration step can be carried out in various ways.

A first way consists in recovering these variables/parameters from a third-party entity, for example from a server or from a removable storage element such as an SD card or a USB key, by means of the communications interface or of a reader appropriate to the aforementioned storage elements, then in memorizing these two variables/parameters Co and ChallR in one or more read-only memories, in the non-volatile memory of the system for example.

Another way consists in generating these variables/parameters inside the system using the joint action of a processing unit CPU of the system and of its random access memory RAM.

In particular, the computations of the CAPTCHA-challenge ChallR and of the reference value Co are carried out respectively based on any value R that can be generated by the system, for example randomly, or obtained from a third-party entity of the type mentioned above, and based on this any value, of a cryptographic function F memorized in the system as well as the sensitive data item P previously obtained and therefore in the memory.

The cryptographic function F can for example be a cryptographic function based on a key such as for example a symmetrical encryption function ENCRYPT. For example, the function F can be a symmetrical encryption function taking as parameter the sensitive data item P and having for encryption key the response R to the CAPTCHA-challenge ChallR: $Co=F(P,R)=ENCRYPT_R(P)$.

The cryptographic function F can for example be a hash function, a SHA3 function for example, or else a hash function composed of another hash function, or else a block encryption function of AES or DES type.

In a variant, the cryptographic function F can be an asymmetrical encryption function. For example, the function F can have an encryption key $f_1(R)$ based on the response R to the CAPTCHA-challenge ChallR, the corresponding decryption key $f_2(R)$ (different from the encryption key since it is an asymmetrical encryption) also being based on the response R to the CAPTCHA-challenge ChallR. Thus, $Co=F(P,R)=ENCRYPT_{f_1(R)}(P)$, $f_1(R)$ being the asymmetrical key used for the cryptographic function ENCRYPT, applied to the secret data item.

The pair of encryption/decryption keys can comprise a public key and private key.

It should be noted that the symmetrical encryption is nothing more than an asymmetrical encryption where $f_1(R)=f_2(R)$.

Preferably, this cryptographic function F is difficult to invert and it must be complicated to find two separate data items such that the values obtained by application of the cryptographic function to these two data items are equal.

In order to further complicate this cryptographic function F, the latter can call on a secret parameter S memorized in the code of a computer program, for example implementing a method according to the invention.

To add a supplementary degree of complexity to this function, the secret parameter S and if necessary the CAPTCHA-challenge ChallR can be updated during system start-up, or else in a regular manner during its operation, for example at each iteration of steps E10 to E30.

The variables R and P are memorized in the random access memory RAM for as long as it takes to perform the configuration computations (step E0), then removed from the system at the end of this configuration step. Only the computed variables/parameters, namely Co and ChallR, are memorized lastingly in the non-volatile memory of the system in this example.

Thus, an attacker of automatic computer system type that might access the non-volatile memory after the configuration E0 can neither directly recover the sensitive data item P nor solve the CAPTCHA-challenge ChallR with the CAPTCHA-response R. Indeed, such an attacking system cannot work backwards to the value of P without the involvement of a human to solve the CAPTCHA-challenge. It can therefore not authenticate itself or decrypt the aforementioned sensitive information.

In a variant, the computation of these variables/parameters and their lasting memorization are not necessarily performed by one and the same device.

For example, in the case of the client-server, the configuration computations E0 can be performed by the server and the results memorized in the non-volatile memory of the mobile telephony terminal after receiving them via the network NTW.

In a variant, the data items could be stored on the server.

Similarly, in the case of the mobile terminal equipped with a secure element, the computations can be carried out by the processing unit CPU of the secure element, then their results memorized in a non-volatile memory of the mobile terminal.

The configuration step E0 can also result from a combination of the methods disclosed above.

Following the configuration E0, during a step E10, the system according to the invention transmits the CAPTCHA-challenge ChallR memorized in step E0 to a user, by way of the interface I/O.

This CAPTCHA-challenge can manifest as one or more images displayed on a screen of the system. A well-known form of CAPTCHA-challenge is composed of one or more deformed images. It can also be an image representing a mathematical operation to be carried out, the solution to which is the response to this CAPTCHA-challenge. These images can if necessary be accompanied by solving advice, so that the solution to the CAPTCHA-challenge complies with a logic defined by this prompt. For example, the prompt can be to click successively on the images in an order defined by the prompt.

In a variant, it can be the emission of a very noisy sound signal or else a sequence of vibrations.

The user is responsible for solving this CAPTCHA-challenge by returning, for example by way of a keyboard (physical or virtual), or in a variant by way of a microphone (dictated response) of the system, a response R' received by this system in an obtaining step E20.

This response can consist for example in the retranscription of a message contained in the displayed image or else of the message contained in the noisy sound signal or in the indication of the number of vibrations felt by the user.

The message of the displayed image or of the sound signal can for example be a sequence of letters and/or digits, a word or else a phrase.

In a step E30, the system according to the invention performs cryptographic processing based notably on the response R' obtained in step E20, on the value Co and on the cryptographic function F.

This cryptographic processing can consist in authenticating a user via a password P' entered by the latter, as will be described later with reference to FIG. 4.

In a variant, this processing can consist in decrypting sensitive information encrypted with the sensitive data item P and memorized in the system, or else in decrypting sensitive information encrypted with the CAPTCHA-response R to the CAPTCHA-challenge as will be described later with reference to FIG. 6 or 7.

When the system comprises several devices, this processing can be performed entirely by the processing unit CPU of one and the same device or else partly by this processing unit and partly by the processing unit of another device of the system.

Figure 4:
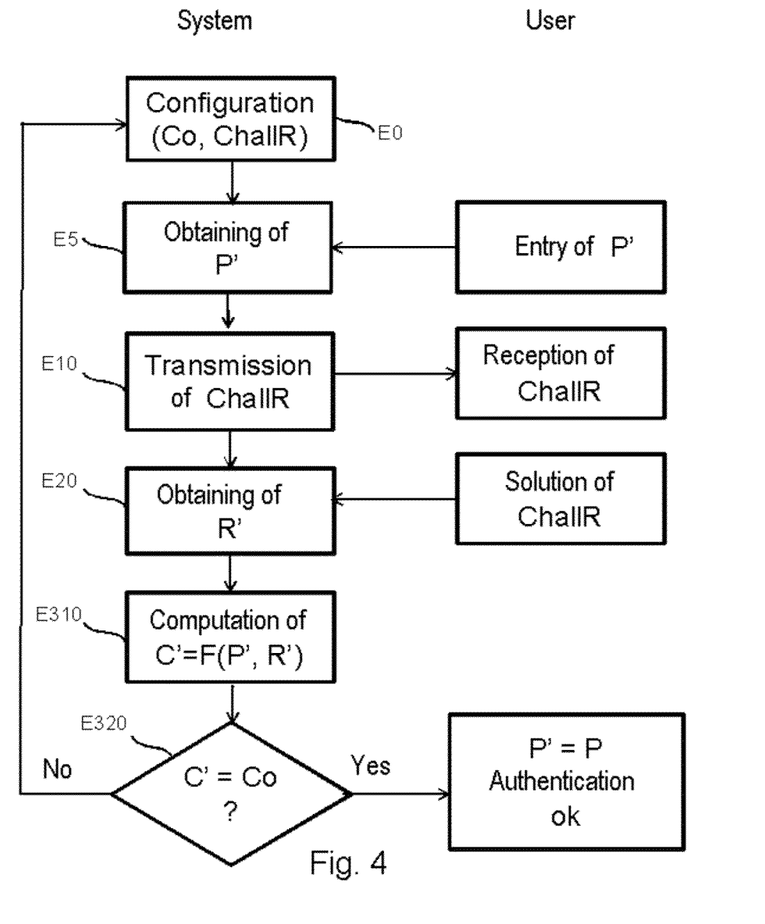
FIG. 4 represents a flowchart illustrating the main steps of a cryptographic processing method according to a first embodiment of the invention.

FIG. 4 represents a flowchart illustrating the main steps of a cryptographic processing method according to a first embodiment of the invention.

This method can be implemented by each of the systems described with reference to FIG. 1 and is akin to a method for authenticating a user using a password.

The authentication for example allows the user to access a service offered by the system.

To simplify, in this example the system is composed of a single device, namely a tablet computer, and the service is accessible via an application of this tablet, previously configured in a step E0 as described with reference to FIG. 3.

A set (ChallR, Co) is therefore memorized in a non-volatile memory of the tablet computer at the end of this configuration step E0, neither P nor R being directly memorized in this same device.

In this embodiment, the user launches an application residing on his tablet in order to authenticate himself to access a particular service, protected by a password. The user then enters a password P' on the virtual keyboard of the tablet.

In reaction to the obtaining of the password P' in step E5, the tablet transmits the memorized CAPTCHA-challenge ChallR to the user in step E10.

This CAPTCHA-challenge consists for example in an image displayed on the screen of the tablet computer.

The user must recognize the sequence of letters and digits contained in the image and retranscribe it by way of the virtual keyboard. The response R' of the user to the CAPTCHA-challenge ChallR is obtained by the tablet computer in step E20.

Figure 5:
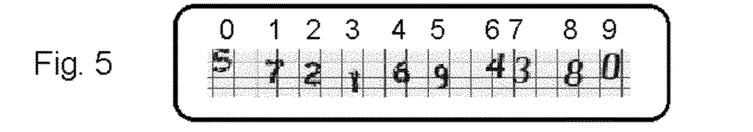
FIG. 5 illustrates an example of a CAPTCHA-challenge being able to be used in a variant of the first embodiment.

In a variant, at the launching of the application, the tablet computer can directly, i.e. prior to step E5, transmit (step E10) to the user a CAPTCHA-challenge ChallR, a particular example of which is represented in FIG. 5.

For example, the user then enters, in a dissociated manner (for example in two separate entry fields), his password P' and a CAPTCHA-response R' to the submitted challenge.

In another example, the CAPTCHA-challenge is designed in such a way that the response R' entered by the user indirectly comprises his password P': $R'=v(P')$ where v is a predetermined function, computed from R in step E0.

In the example of FIG. 5, the function v is a correspondence table, computed in the configuration step E0 as a function of the CAPTCHA-response R and of the sensitive data P, such that v notably satisfies the equality R=v(P). Thus the user does not directly enter his password P' but the corresponding digits according to this table v.

For example, to solve the CAPTCHA-challenge in FIG. 5, if the password of the user is P'=0246, he will have to enter the response R'=5264.

This variant makes it possible to save on exchanges with the user and to proceed more quickly with the authentication of the user.

On returning to the example in FIG. 4, the cryptographic process then comprises in this first embodiment a step of computing E310 the value C'=F(P', R') of the cryptographic function F as a function of the password P' entered by the user and of the response R' of the user to the CAPTCHA-challenge ChallR.

It should be noted that in the case of the CAPTCHA-challenge in FIG. 5, the password P' of the user is obtained by applying the reciprocal function v to the response R' of the user obtained in step E20: P'=v$^{-1}$(R'). Thus in this example, the value C' is computed as follows: C'=F(v$^{-1}$(R'), R').

The cryptographic process furthermore comprises a step E320 of comparing the computed value C' with the reference value Co memorized in the prior configuring step E0.

When these two values are equal, the tablet computer authenticates the user and allows him to access the desired service.

Otherwise, the user is not authenticated and cannot access the service.

In the example represented, when the comparison step E320 does not result in the authentication of the user, the method is repeated after a new configuration step E0 as described with reference to FIG. 3.

Of course, the configuration step E0 is optional in a new iteration of the method. Thus a same CAPTCHA-challenge could be used in several iterations of the method.

Notably, a new value $R_2$ is generated on this occasion.

In an embodiment, the new configuration step (i.e. that previous to the following iteration) can be simplified by computing the new reference value $Co_2$ incrementally, with respect to the reference value Co used in the previous iteration: $Co_2$=u(Co, $R_2$) where u is a given function.

Thus, the computation of the new reference value $Co_2$ does not require access to the sensitive data P as is the case for the computation of the reference value Co. In this embodiment, access to the sensitive data P is therefore limited to the configuration step of the initial iteration.

At the end of this new configuration step, a new pair (ChallR$_2$, Co$_2$) is available in the non-volatile memory of the tablet computer, the values $R_2$ and P not being kept in the memory of the system.

This new configuration step makes it possible to propose a new CAPTCHA-challenge ChallR$_2$ to the user and to carry out as previously the different steps of obtaining E5 of a password P' entered by the user, of transmission E10 of the new CAPTCHA-challenge ChallR$_2$, of obtaining E20 of a response R'$_2$ of the user to the CAPTCHA-challenge, of computation E310 of a new value C'$_2$=F(P'R'$_2$) up to the comparison step E320 during which the new computed value C'$_2$ is compared to the new reference value Co$_2$ memorized in the new configuration step E0.

The user can therefore attempt to authenticate himself again but he must solve a new CAPTCHA-challenge.

Figure 6:
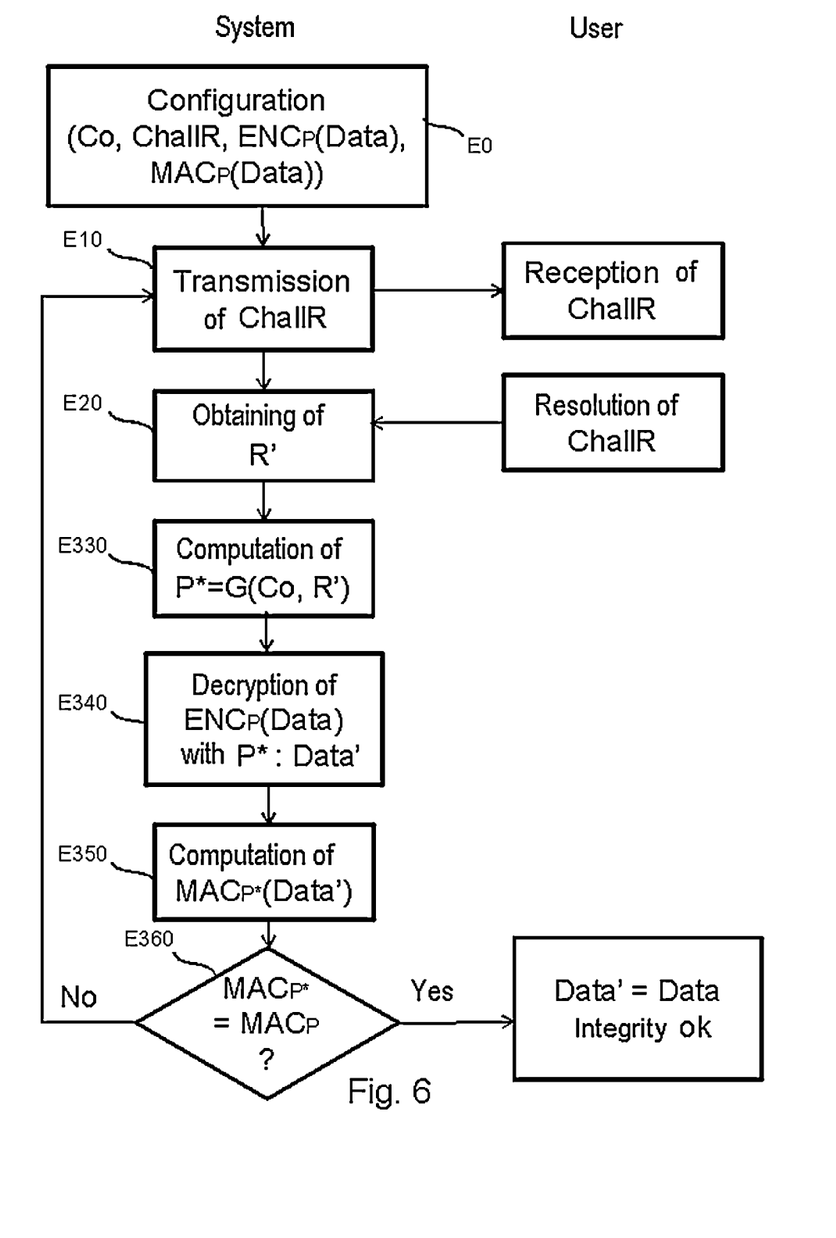
FIG. 6 represents a flowchart illustrating the main steps of a cryptographic processing method according to a second embodiment of the invention.

FIG. 6 represents a flowchart illustrating the main steps of a cryptographic processing method according to a second embodiment of the invention.

This method can be implemented by each of the systems described with reference to FIG. 1 and is akin to a method for securing access to encrypted sensitive information, referenced Data.

In the example in FIG. 6, this sensitive information is encrypted with the aforementioned sensitive data P then serving as encryption key K, K=P: ENC$_K$(Data).

For example, the encryption function ENC can be any cryptographic function with a symmetric key, but not exclusively.

In particular, in this example the system comprises a mobile telephony terminal communicating with a server via a telecommunications network NTW as described with reference to FIG. 1. The terminal has been previously configured in a step E0 at the end of which the set (Co, ChallR, ENC$_K$(Data)) is memorized in the non-volatile memory, of the terminal for example.

As a reminder, Co=F(P,R), for example Co=ENCRYPT$_R$(P) for a function F of symmetric encryption and Co=ENCRYPT$_{f1(R)}$(P) for a function F of asymmetric encryption.

Generally, an encryption function F endowed with a reciprocal function G satisfies the following equalities as far as the values Co and P are concerned:

$$Co=F(P,R)=ENC_{f1(R)}(P)$$

$$P=G(C,R)=DEC_{f2(R)}(Co)$$

where $f_1$ is the encryption key of the cryptographic function F and $f_2$ is the encryption key of the reciprocal function G. These keys both depend on the solution R to the CAPTCHA-challenge.

As described above, F can be a symmetrical encryption function, in which case there is equality between these keys: $f_1$(R)=$f_2$(R). Par example, $f_1$(R)=$f_2$(R)=R.

In a variant, the function F can be an asymmetrical encryption function and the keys $f_1$(R) and $f_2$(R) can be a public key/private key pair.

Optionally and as represented in FIG. 6, a message authentication code MAC$_K$(Data) (for Message Authentication Code) can be memorized during this configuration step E0.

This message authentication code which operates as a function of the sensitive data P as key (K=P) and the sensitive information Data makes it possible to add an additional degree of security to the method with respect to an automatic system attacking and verifying the integrity of the decrypted sensitive information during the implementation of the method.

Co and ChallR are obtained in a similar manner to that which has been described previously in connection with FIG. 3.

Similarly, ENC$_K$(Data) and MAC$_K$(Data) can be obtained by a third-party entity, or in a variant computed by the processing unit CPU of the terminal, then memorized in its non-volatile memory.

At the end of the configuration step E0, ChallR, ENC$_K$(Data) and MAC$_K$(Data) are stored in the system but P and R are not.

Returning to our example, steps E10 and E20 are identical to those described with reference to FIG. 3 and result in the obtaining of a response R' of a user to a CAPTCHA-challenge ChallR.

The processing step, previously introduced in a general manner with reference to FIG. 3, comprises in this second mode a step E330 of computation of a value P* obtained by application of the reciprocal function G of the cryptographic function F to a pair of values Co and R', where Co is the reference value Co memorized during configuration and R' is the obtained entered response: $P^*=G(Co, R')$ where $G=F^{-1}$ is the reciprocal function of the cryptographic function previously used to compute Co.

In the case where F is a symmetric encryption function, the reciprocal G is the decryption function reciprocal to F, using the same asymmetric key R, namely $P^*=G(Co, R')=DECRYPT_{R'}(Co)$.

In the case where F is an asymmetric encryption function, the reciprocal G is the decryption function reciprocal to F, using the other asymmetric key $f_2(R)$, namely $P^*=G(Co, R')=DECRYPT_{f2(R')}(Co)$.

In an embodiment implementing an asymmetric encryption function, (PK,SK) denotes the pair of asymmetric keys, PK being the public key and SK the private key. In this particular exemplary embodiment, $f_1$ is chosen such that $f_1(R)=PK$ for all possible values of R, and $f_2$ is chosen such that $f_2(R)=SK$ when R is the expected value. An example for $f_2$ is the following: $f_2(R)=DEC_R(ENC_R(SK))$ where ENC/DEC is a reciprocal pair of functions of symmetric encryption for example. This example requires only that the cryptographic processing system stores, in memory, the value $ENC_R(SK)$, which could therefore be provided at the configuration step E0.

Then, in the example in FIG. 6, the cryptographic process also comprises a step of decryption E340 of the encrypted sensitive information $ENC_K(Data)$, using the encryption key computed $K'=P^*$. Conventional techniques of decryption by key (notably symmetrical) can be employed. The information $Data'=DEC_{K'}(ENC_K(Data))$ is then obtained.

Optionally and as represented in FIG. 6, when the code $MAC_K(Data)$ has been memorized in the configuration step E0, the processing step can also comprise:
  the computation (step E350) of a message authentication code $MAC_{K'}(Data')$ as a function of the encryption key computed $K'=P^*$ in step E330 and of the sensitive information Data' decrypted in step E340 using this encryption key $K'=P^*$, and
  a step E360 of comparison of the computed code $MAC_{K'}(Data')$ with the code memorized $MAC_K(Data)$ in the prior configuration step E0.

When these two codes are equal, the system considers that the decrypted sensitive information Data' is intact. The user can then access it via his terminal.

In the event of erroneous decryption or erroneous message authentication code, the system executes the method again as represented in FIG. 6, starting with the retransmission of the previous CAPTCHA-challenge.

In a variant, as described with reference to FIG. 5, the CAPTCHA-challenge can be renewed in a new configuration step E0, using a new value $R_2$.

In a variant of the example described here, the preliminary configuration step E0 can comprise the memorization of data items Data instead of $ENC_K(Data)$ and the encryption key $K'=P^*$ computed in step E330 can serve to encrypt these data items Data: $ENC_{K'}(Data)$, so that they are not exploited by an attacker who might be monitoring the network at the time of their transmission to a recipient. Step E360 is then replaced by the transmission of encrypted data on the network.

In this variant, the configuration step E0 can provide the memorization of $MAC_K(ENC_K(Data))$ so that the optional step E350 can be used to verify that the key used K' is that expected, thereby computing a message authentication code on the encrypted data: $MAC_{K'}(ENC_K(Data))$, and comparing this code with $MAC_K(ENC_K(Data))$ in memory.

In another variant, the key K used can be obtained as a hash value of a concatenation between the sensitive data P and the whatever value R: $K=\text{hash}(P|R)$ where '|' is the concatenation operator. In this variant, the verification of integrity is conducted on the value R defining the CAPTCHA and no longer on the data Data, in order to reduce the complexity of the process.

In the configuration step E0, it is the values $ENC_K(Data)$ and $MAC_K(R)$ which are then memorized using this key, in a non-volatile memory.

The decryption step E340 comprises the computation of the decryption key K' using R' obtained in step E20 and $P^*$ obtained in step E33: $K'=\text{hash}(P^*|R')$. This key K' is then used in the decryption of step E340: $Data'=DEC_{K'}(ENC_K(Data))$.

Then step E350 consists in the computation of the message authentication code, using this key K', on the value R' obtained in step E20: $MAC_{K'}(R')$.

Step E360 then compares $MAC_{K'}(R')$ with $MAC_K(R)$ in memory to detect any error.

In yet another variant of FIG. 6, the key for encryption/decryption is $K_1=P$ ($K'_1=P^*$ in step E340) whereas a different key $K_2$ is used for the message authentication code, for example $K_2$ is the hash value mentioned above $K_2=\text{hash}(P|R)$ ($K'_2=\text{hash}(P^*|R')$ in step E350).

In another variant, a code $MAC_K(Data^*)$ is computed with a data item Data* advantageously of smaller size than the data item Data to be encrypted/decrypted. This data item Data* differs from the response to the CAPTCHA-challenge R. The code $MAC_K(Data^*)$ is then memorized at the configuration step E0.

This data item Data*, known to the user, for example an item of personal data, is asked of him during the method. A code $MAC_{K'}(Data^*)$, where K' is a key obtained as described previously, is computed from the personal data obtained from the user and is then compared to the code $MAC_K(Data^*)$ in memory.

Thus, this data item Data* makes it possible to carry out an additional control nonetheless mobilizing resources in a limited manner, since the object of the control has a substantially smaller size then the data Data to be encrypted/decrypted.

Figure 7:
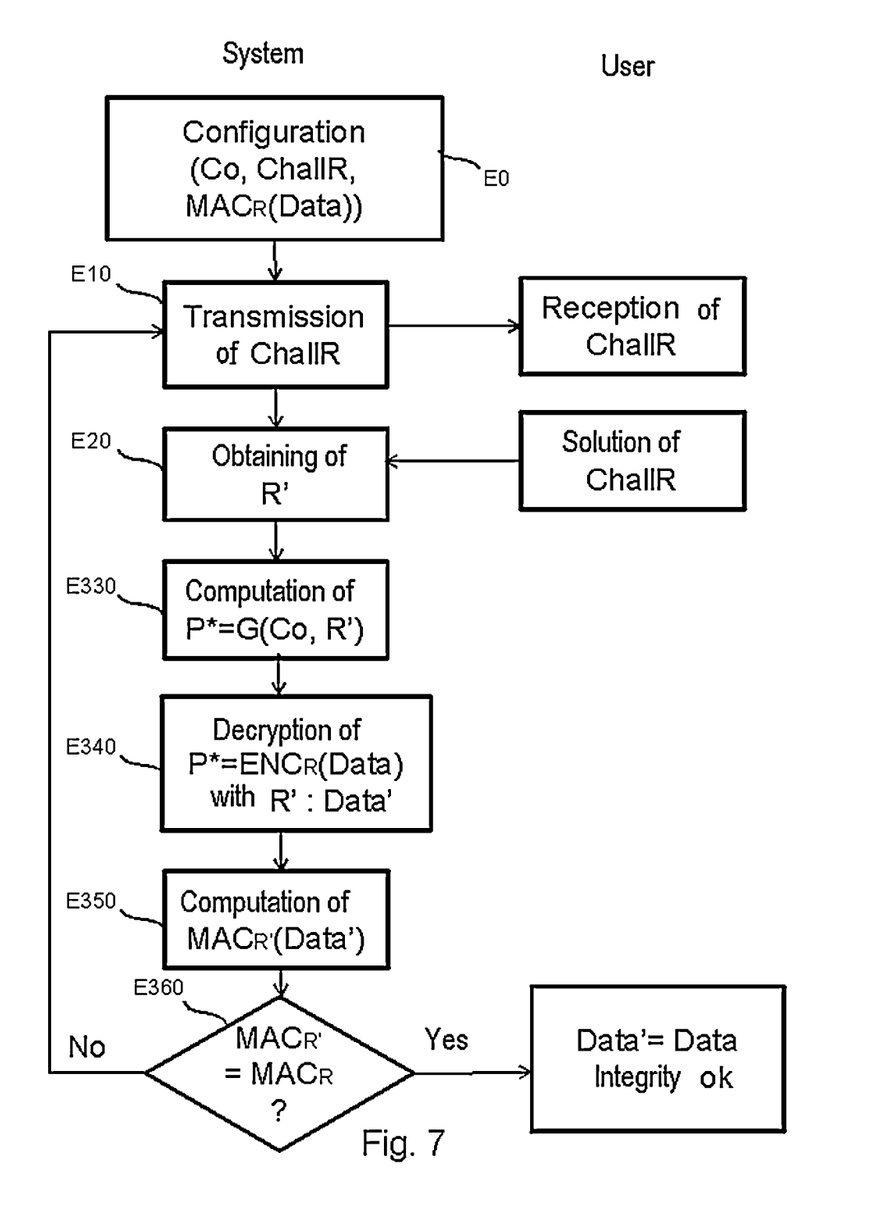
FIG. 7 represents a flowchart illustrating the main steps of a cryptographic processing method according to a variant of the second embodiment of the invention.

FIG. 7 represents a flowchart illustrating the main steps of a variant of the cryptographic processing method described with reference to FIG. 6.

In this variant, the sensitive information Data is not encrypted with the sensitive data item P, but the sensitive data item P itself represents the sensitive information encrypted using the value R (CAPTCHA-response to the CAPTCHA-challenge) used as encryption key $K=R$: $P=ENC_K(Data)$.

The encryption of this information can be performed by the system or else the sensitive data item P can be directly obtained from a third-party entity, as described with reference to FIG. 3.

The computation of $Co=ENCRYPT_K(P)=ENCRYPT_K(ENC_K(Data))$ with $K=R$ is carried out in the same way as previously described, based on the sensitive data item $P=ENC_K(Data)$ and on the value R. As to the message authentication code, when it is implemented, the latter is computed based on the value R (and not P as in the preceding embodiment) serving as encryption key K to the sensitive information Data: $MAC_K(Data)$ with $K=R$.

Thus, at the end of this configuration step E0, the set in the terminal memory is as follows: (Co, ChallR, $MAC_K(Data)$), P and R not being in the memory of the terminal.

It should be noted that in the case of the use of an asymmetric encryption function F such as that mentioned previously, the key $f_1(R)$ is used in such a way that $Co=ENCRYPT_{f1(R)}(P)=ENCRYPT_{f1(R)}(ENC_K(Data))$, where $K=R$.

Steps E10, E20, E330 are identical to those described with reference to FIG. 6. At the end of step E330 the encrypted sensitive information is therefore obtained: P*=G(Co, R')=ENC_K(Data) and the decryption step E340 differs from that of FIG. 6 in that the encrypted sensitive information P*=ENC_K(Data) is decrypted using the response R' of the user obtained in step E20 and used as decryption key K'=R'. Information Data'=DEC_K'(P*)=DEC_K'(ENC_K(Data)) is then obtained.

Of course, the data encryption function can be chosen asymmetrical (for example identical to ENCRYPT), K and K' then being able to take the values $f_1(R)$ and $f_2(R')$ respectively.

Steps E350 and E360 differ from those previously described in that the computed code MAC_K'(Data') is a function of the response R' of the user used as key K', the compared codes being the same as previously: the code MAC_K'(Data') computed and the code MAC_K(Data) memorized during the previous configuration step.

The above examples are only embodiments, the invention not being limited thereto.

The invention claimed is:

1. Method of cryptographic processing using a sensitive data item (P) in a cryptographic processing system comprising in memory a test making it possible to tell a human and a computer apart (ChallR) as well as a reference value (Co) obtained by applying a cryptographic function (F) to a pair of values P and R, where P is said sensitive data item and R is a solution to the memorized test (ChallR), said method comprising:
   a step of configuration (E0) of the cryptographic processing system, comprising the obtaining and memorization of said reference value (Co) in said cryptographic system, then
   a step of transmission (E10) of the memorized test (ChallR) to a user,
   a step of obtaining (E20) of a response (R') from the user to said transmitted test,
   a step of cryptographic processing (E30) based on the sensitive data item (P), using said obtained response (R'), said reference value (Co) and said cryptographic function (F),
   said method being characterized in that said reference value (Co) and said test (ChallR) are in the memory of said cryptographic processing system and said solution (R) is not in the memory of said cryptographic processing system, during said transmission step (E10).

2. Processing method according to claim 1, characterized in that said test is a CAPTCHA-challenge (ChallR) the solution to which is a CAPTCHA-response (R).

3. Processing method according to claim 1, characterized in that it furthermore comprises a step of obtaining (E5) a data item (P') entered by the user, and in that said cryptographic processing step (E30) comprises:
   a step of computation (E310) of a value (C) obtained by applying said cryptographic function (F) to a pair of values P' and R', where P' is said entered data item and R' is said obtained response, and
   a step of comparison (E320) of said computed value (C) with said reference value (Co), so as to verify that the entered data item (P') is equal to the sensitive data item (P).

4. Processing method according to claim 3, characterized in that said cryptographic function (F) is a one-way function.

5. Processing method according to claim 1, characterized in that said processing step (E30) comprises:
   a step of computation (E330) of a value (P*) obtained by applying a reciprocal function (G) of said cryptographic function (F) to a pair of values Co and R', where Co is said reference value and R' is said obtained entered response, and
   a step of encryption or decryption (E340) of a sensitive information item (ENC_P(Data), ENC_R(Data)) using the computed value (P*) of the reciprocal function (G).

6. Processing method according to claim 5, characterized in that said computed value (P*) of the reciprocal function is an encryption key used in the decryption step to decrypt the encrypted sensitive information item (ENC_P(Data)) stored in the memory of said cryptographic processing system.

7. Processing method according to claim 5, characterized in that said encrypted sensitive information item (ENC_R(Data)) to be decrypted is said computed value (P*) of the reciprocal function, the step of decryption of said computed value (P*) of the reciprocal function comprises the use of an encryption key based on said response obtained (R') from the user.

8. Processing method according to claim 1, characterized in that the cryptographic function (F) and a reciprocal function (G) of said cryptographic function are asymmetrical encryption functions of which the pair of asymmetrical encryption keys is based on said solution (R) to the memorized test (ChallR).

9. Processing method according to claim 5, characterized in that said cryptographic processing system furthermore comprises in memory a message authentication code (MAC_P(Data); MAC_R(Data)) applied to said sensitive information item (Data) and having for secret key said sensitive data item (P) or said solution (R), and in that said cryptographic processing step (E30) furthermore comprises:
   a step (E350) of computation of a message authentication code (MAC_{P*}(Data'); MAC_R(Data')) applied to said decrypted sensitive information item and having for secret key said encryption key computed (P*) or obtained (R') by said cryptographic processing system, and
   a step (E360) of verification of the integrity of the sensitive information item decrypted by comparison of said memorized authentication code (MAC_P(Data); MAC_R(Data)) with said computed authentication code (MAP_{P*}(Data'); MAC_R(Data')).

10. Processing method according to claim 1, characterized in that it furthermore comprises a new iteration of the steps of transmission (E10), obtaining (E20) of a second response (R'2) and cryptographic processing (E30), using a second test making it possible to tell a human and a computer apart (ChallR2) having a second solution (R2) and of a second reference value (Co2) obtained by applying the cryptographic function (F) to a pair of values P and R2, where P is said sensitive data item and R2 is said second solution, said second reference value (Co2) and said second test (ChallR2) being in the memory of said cryptographic processing system and said second solution (R2) not being in the memory of said cryptographic processing system during said step of transmission (E10) of this new iteration.

11. Processing method according to claim 10, characterized in that said second reference value (Co2) is computed from said reference value (Co) of the previous test and from said second solution (R2), without handling said sensitive data item (P).

12. Cryptographic processing system comprising:
   at least one memory (ROM) comprising a test making it possible to tell a human and a computer apart (ChallR) as well as the reference value (Co) obtained by applying a cryptographic function (F) to a pair of values P and R, where P is a sensitive data item and R is a solution to the test (ChallR), means (E0) of configuration of the cryptographic processing system, comprising means of obtaining and memorization of said reference value (Co) in said cryptographic system, prior to the transmission of said memorized test to a user, means (I/O) of transmission of said memorized test (ChallR) to a user, means (I/O) of obtaining a response (R') from the user to said transmitted test, processing means (CPU) configured to perform cryptographic processing based on the sensitive data item (P) using said obtained response (R'), said reference value (Co) and said cryptographic function (F), said system being characterized in that it comprises in memory said reference value (Co) and said test (ChallR), and in that it does not comprise in memory said solution (R), when the transmission means (I/O) are implemented.

13. Processing system according to claim 12, characterized in that it furthermore comprises means (I/O) of obtaining a data item (P') entered by the user, and in that said cryptographic processing means comprise:

means (CPU) of computation of a value (C) obtained by applying said cryptographic function (F) to a pair of values P' and R', where P' is said entered data item and R' is said obtained response, and means (CPU) of comparison of said computed value (C) with said reference value (Co), so as to verify that the entered data item (P') is equal to the sensitive data item (P).

14. Processing system according to claim 12, characterized in that said processing means comprise:

means (CPU) of calculation of a value (P*) obtained by applying the reciprocal function (G) of said cryptographic function (F) to a pair of values Co and R', where Co is said reference value and R' is said obtained response, and means (CPU) of decryption of an encrypted sensitive information item ($ENC_P$(Data), $ENC_R$(Data)) using an encryption key computed (P*) or obtained (R') by said cryptographic processing system.

15. Processing method according to claim 2, characterized in that it furthermore comprises a step of obtaining (E5) a data item (P') entered by the user, and in that said cryptographic processing step (E30) comprises:

a step of computation (E310) of a value (C) obtained by applying said cryptographic function (F) to a pair of values P' and R', where P' is said entered data item and R' is said obtained response, and a step of comparison (E320) of said computed value (C) with said reference value (Co), so as to verify that the entered data item (P') is equal to the sensitive data item (P).

16. Processing method according to claim 2, characterized in that said processing step (E30) comprises:

a step of computation (E330) of a value (P*) obtained by applying a reciprocal function (G) of said cryptographic function (F) to a pair of values Co and R', where Co is said reference value and R' is said obtained entered response, and a step of encryption or decryption (E340) of a sensitive information item ($ENC_P$(Data), $ENC_R$(Data)) using the computed value (P*) of the reciprocal function (G).

17. Processing method according to claim 6, characterized in that the cryptographic function (F) and its reciprocal (G) are asymmetrical encryption functions of which the pair of asymmetrical encryption keys is based on said solution (R) to the memorized test (ChallR).

18. Processing method according to claim 6, characterized in that said cryptographic processing system furthermore comprises in memory a message authentication code ($MAC_P$(Data); $MAC_R$(Data)) applied to said sensitive information item (Data) and having for secret key said sensitive data item (P) or said solution (R), and in that said cryptographic processing step (E30) furthermore comprises:

a step (E350) of computation of a message authentication code ($MAC_{P*}$(Data'); $MAC_{R'}$(Data')) applied to said decrypted sensitive information item and having for secret key said encryption key computed (P*) or obtained (R') by said cryptographic processing system, and a step (E360) of verification of the integrity of the sensitive information item decrypted by comparison of said memorized authentication code ($MAC_P$(Data); $MAC_R$(Data)) with said computed authentication code ($MAP_{P*}$(Data'); $MAC_{R'}$(Data')).

\* \* \* \* \*